(12) United States Patent
Kim et al.

(10) Patent No.: US 12,361,072 B1
(45) Date of Patent: Jul. 15, 2025

(54) TWO-STAGE TIME-ENRICHED SYSTEM AND METHOD FOR QUERY CLUSTERING

(71) Applicant: Yahoo Assets LLC, New York, NY (US)

(72) Inventors: Donghyun Kim, Mountain View, CA (US); Xinyue Wang, Santa Clara, CA (US); Rao Shen, Sunnyvale, CA (US); Chang Lu, Jersey City, NJ (US); Liuqing Li, San Jose, CA (US)

(73) Assignee: Yahoo Assets LLC, New York, NY (US)

( * ) Notice: Subject to any disclaimer, the term of this patent is extended or adjusted under 35 U.S.C. 154(b) by 0 days.

(21) Appl. No.: 18/656,678

(22) Filed: May 7, 2024

(51) Int. Cl.
  *G06F 16/906* (2019.01)
  *G06F 16/23* (2019.01)
  *G06F 16/2457* (2019.01)
  *G06F 16/955* (2019.01)

(52) U.S. Cl.
  CPC ........ *G06F 16/906* (2019.01); *G06F 16/2322* (2019.01); *G06F 16/24578* (2019.01); *G06F 16/955* (2019.01)

(58) Field of Classification Search
  CPC ............... G06F 16/906; G06F 16/2322; G06F 16/24578; G06F 16/955
  See application file for complete search history.

(56) References Cited

U.S. PATENT DOCUMENTS

| 8,838,604 | B1 * | 9/2014 | Osinga | G06F 16/958 707/750 |
| 2014/0025734 | A1 * | 1/2014 | Griffin | G06Q 50/01 709/204 |
| 2021/0326316 | A1 * | 10/2021 | Marquardt | G06F 16/221 |

\* cited by examiner

*Primary Examiner* — Etienne P LeRoux
(74) *Attorney, Agent, or Firm* — Cooper Legal Group LLC

(57) ABSTRACT

In an example, in connection with a search clustering system, a grouping component retrieves a timestamp set of news queries and determines a time-stable set of news query groups by performing the first stage of a two-stage clustering technique. A clustering component determines a time-stable set of news query groups clusters by performing the second stage of the two-stage clustering technique. The performance of the two-stage clustering technique is aided by a least recently used caching component. The time-stable set of news query groups clusters may be served to a web page in order to generate a trending topic list for display.

20 Claims, 12 Drawing Sheets

N - Not occurred

U - Ungrouped

G - Grouped

TWO-STAGE TIME-ENRICHED SYSTEM AND METHOD FOR QUERY CLUSTERING

BACKGROUND

Popular search engines receive hundreds of millions of user searches day by day. Such timely and rich information can not only explicitly show users' interests but also implicitly reflect some ongoing popular events. For example, some websites include a trending news portion that lists popular from recent user searches. However, many techniques for mining user search information to generate trending topics and search insights may involve clustering that suffers from relatively high fluctuations due to the ever-changing search information and imprecision due to lexical imprecision.

SUMMARY

In accordance with the present disclosure, one or more systems and/or methods are provided. In an example, in connection with a search clustering system, a grouping component retrieves a timestamp set of news queries. A grouping component determines a time-stable set of news query groups from the timestamp set of news queries by performing the first stage of a two-stage clustering technique. The grouping component determines, for each pair of news queries in the timestamp set of news queries, whether a predefined feature similarity condition between the pair is satisfied and, if so, classifies the pair as having a grouped timestamp-level grouping status, and if not, classifies the pair as having an ungrouped timestamp-level grouping status. Further, the grouping component determines a window-level grouping status of the pair based on whether a predefined window-level similarity condition between the pair is satisfied and if so, classifies the pair as having a grouped window-level grouping status, and if not, classifies the pair as having an ungrouped window-level grouping status. The time-stable set of news query groups means a set of news query pairs in the timestamp set of news queries having a window-level grouping status classification indicative of being grouped.

A clustering component determines a time-stable set of news query groups clusters by performing the second stage of the two-stage clustering technique. The clustering component determines a timestamp-level group distance for each pair of groups in the time-stable set of news query groups, wherein each pair of groups comprises a first group and a second group. The clustering component determines, for each pair of groups in the time-stable set of news query groups, a timestamp-level query-pair distance for each query pair between queries of the first group and queries of the second group by setting each timestamp-level query-pair distance between the first group and the second group to a distance based on the timestamp-level group distance between the first group and the second group. The clustering component determines, for each query pair, as between queries of the first group and queries of the second group of each pair of groups in the time-stable set of news query groups, a window-level query-pair distance based on a rolling average of the timestamp-level query-pair distances. For each pair of groups in the time-stable set of news query groups, the clustering component identifies a minimum window-level query-pair distance. It determines a final group distance for each pair of groups in the time-stable set of news query groups based on the minimum window-level query-pair distance associated with the pair. It clusters the time-stable set of news query groups using the final group distances.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
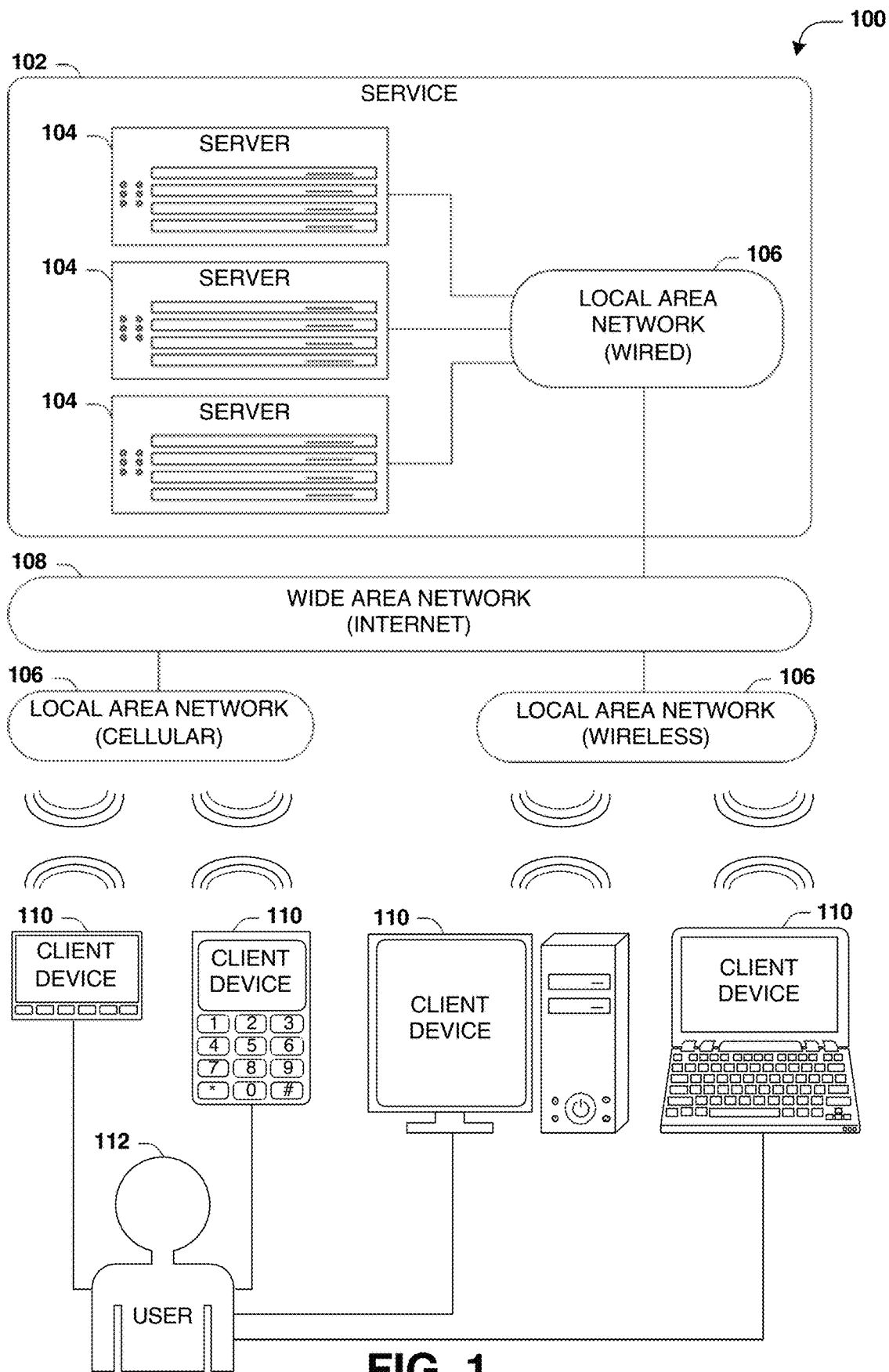
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP)). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ different architectures, may be compliant or compatible with differing protocols and/or may interoperate within the local area network 106. Additionally, a variety of local area networks 106 may be interconnected; e.g., a router may provide a link between otherwise separate and independent local area networks 106.

In scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
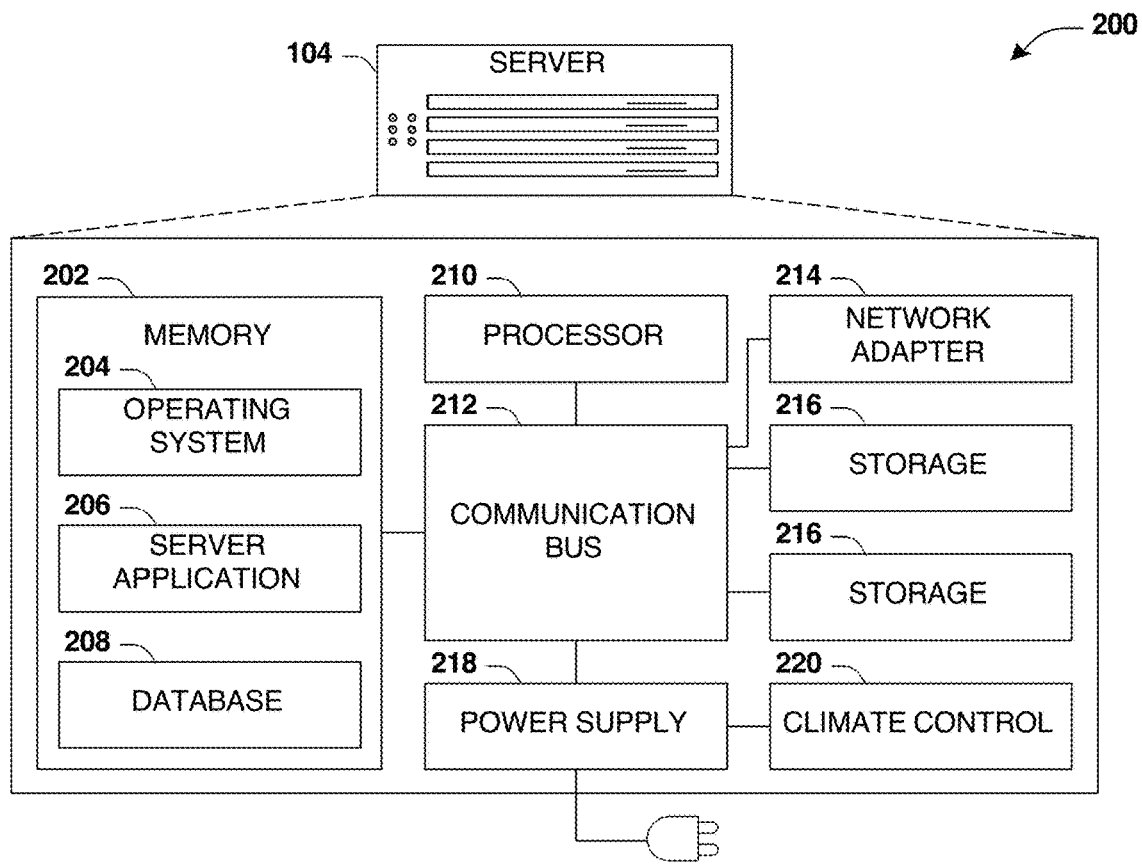
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic architecture diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
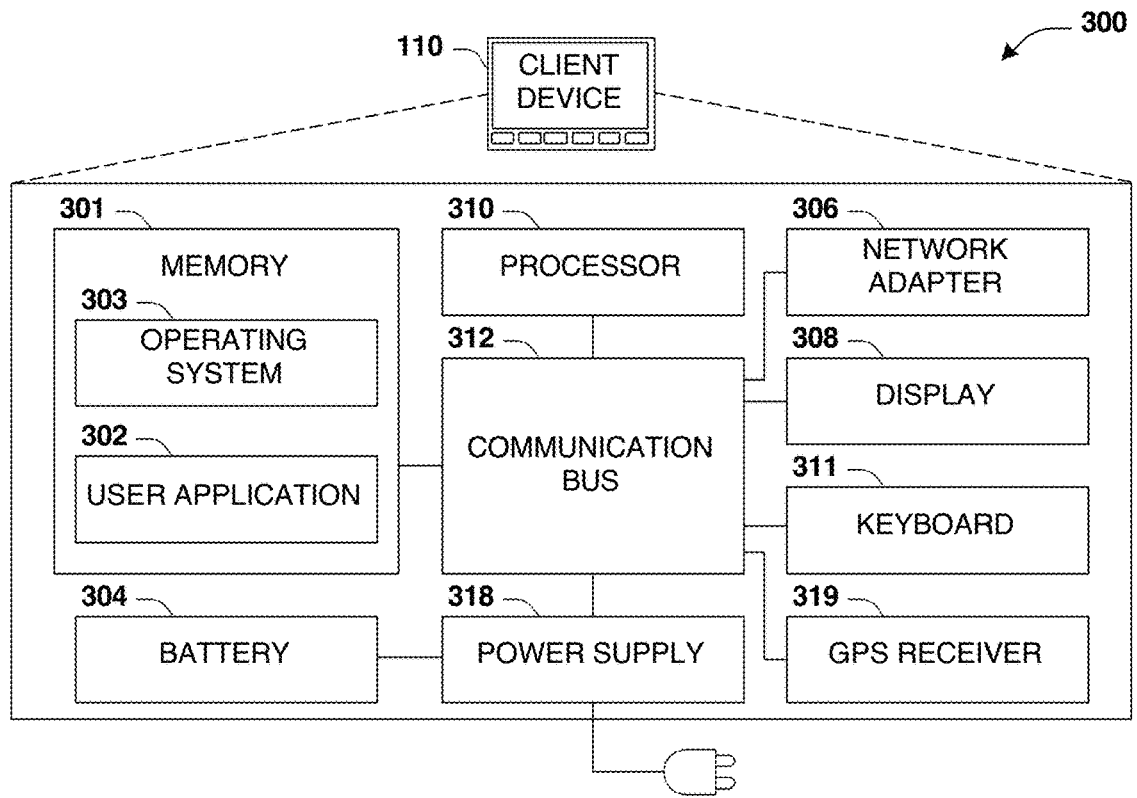
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

2. Presented Techniques

In a search environment, one or more systems and/or techniques are provided herein for efficiently generating stable and effective clustered sets of news queries from unclustered sets of news queries and/or utilizing the clustered sets to generate a trending news list or otherwise perform a search assistance task.

Figure 4:
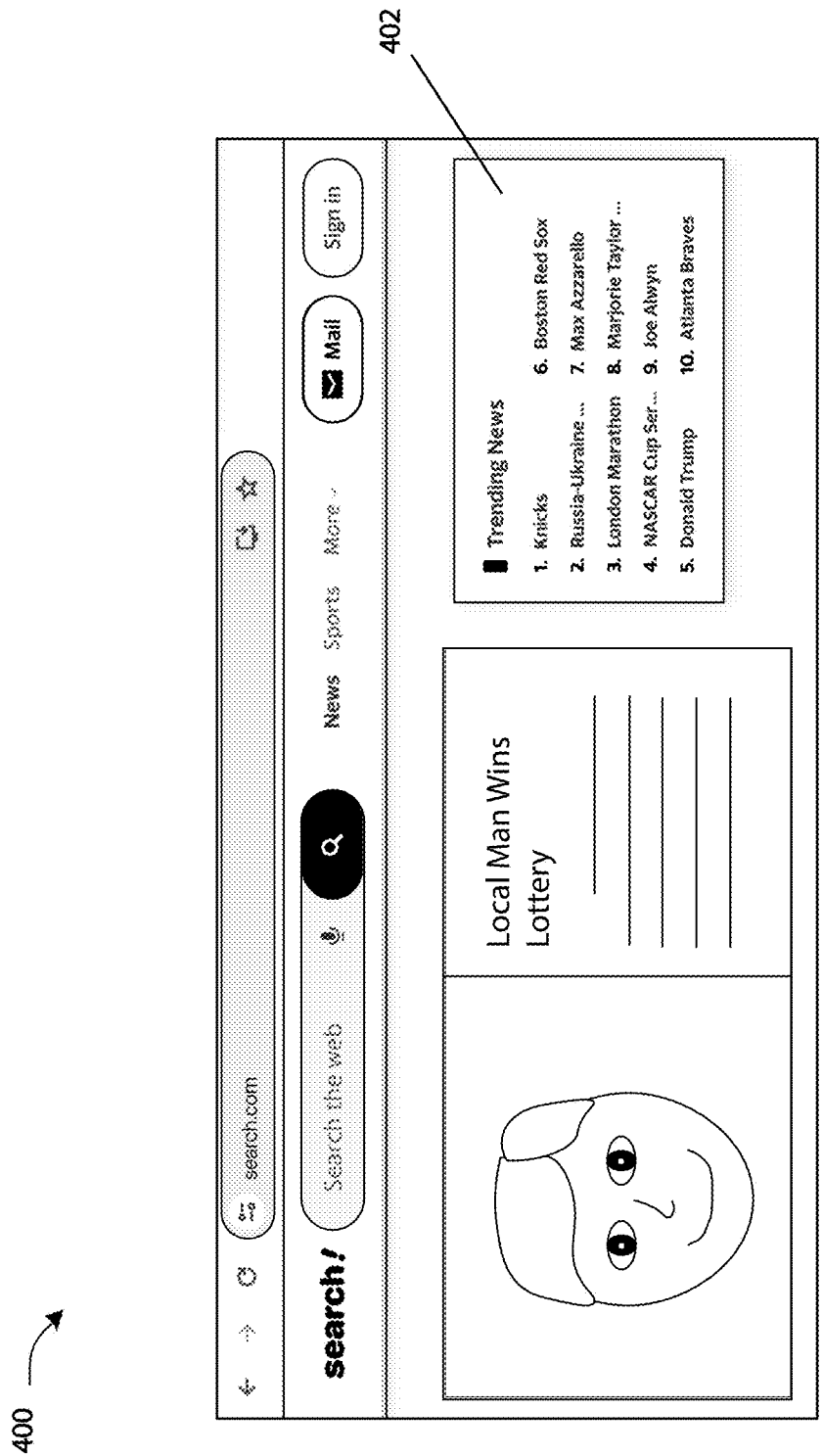
FIG. 4 is a line drawing illustrating a webpage, a portion of which displays a trending news section, in accordance with one or more embodiments set forth herein.

Popular search engines search information may be leveraged for various purposes, such as for example, to perform search assistance (e.g., recommend popular queries to a user) or generate a listing of popular and current searches for informational or news purposes. One example of such use is illustrated on the exemplary webpage 400 in FIG. 4, showing a "Trending News" listing 402 that reflects a current, ranked listing of news-related recent user search terms.

For popular search ranking or recommendation, query clustering may be considered a material component that can aggregate similar searches into different clusters by considering the lexical and semantic features of search queries, including their corresponding news articles. One solution could be to merge user queries that share identical search terms within the user searches or their corresponding news articles. For example, "FIFA World Cup" and "FIFA World Cup 2024" may be in the same cluster since they share most of the search terms, while "Donald Trump" and "Joe Biden" may be gathered together as their shared news articles may contain both terms that are related to "Presidential Election". However, such a one-stage solution may not be able to handle the query clustering task well for a number of reasons including, for example, one or more of the following reasons.

In general, conventional one-stage clustering techniques may not excel in a changing environment like Search. Such approaches may take a set of data points as input and produce several separated clusters. Although each point represents an individual query in query clustering within the search domain, the queries' attributes and the characteristics of their corresponding news articles may exhibit temporal variation. Because the number of user searches may change significantly even in a single day and because the spacing of points may update over time, especially for news articles, for many unsupervised techniques (which may rely on the number of clusters k or a threshold point distance E for clustering criteria) it is not feasible to fix criteria to allow for time-stable clusters for many purposes.

Some heuristic approaches may conduct query clustering through lexical matches on each pair of queries, including in some cases their corresponding news articles, resulting in a relatively high rate of incorrect clustering results. For example, although the search terms "free fire" and "Truckee Fire" can be clustered in such heuristic approaches since both share the same word "fire", "free fire" may refer to a mobile game and "Truckee Fire" may refer to a wildfire. As another example, "Ukraine funding" can be grouped with "Israel aid" because some articles of one query may also contain the other query. In other words, lexical information may not be effective at comprehensively and precisely depicting user queries and news articles.

The embodiments herein describe a two-stage, time-enriched system and technique for stable and effective query clustering. As described in more detail below, improved effectiveness is achieved, in part, by performing a feature-based (e.g., URL-based) grouping among search queries to create small groups of high quality, followed by an unsupervised content-based clustering at the group level to combine groups into clusters. In particular, regarding the latter stage, group clustering may be achieved using semantic information (e.g., embeddings from news titles and abstracts, as well as embeddings of entities extracted from news articles). Also as described in more detail below, improved temporal-stability of the clusters is achieved via time-window based voting in the first stage and the use of rolling average distances in the second stage. Regarding the latter, given a user query, each news article associated with the query within a time window (multiple consecutive timeslots) may be maintained in certain embodiments, and utilized to smooth clustering results.

In some embodiments, a caching mechanism may be utilized to store and retrieve certain material information (e.g., queries, query information such as news articles, embeddings, etc.) utilized in the techniques herein, to avoid duplicative processing tasks. For example, given a user query, the embodiments disclosed herein may first determine whether the query and/or any of its corresponding material information exists in the cache. If so, the relevant information may be directly retrieved from the cache without further computation (e.g., embeddings generation), thus significantly reducing the processing time.

Efficiently generating stable and effective clustered sets of user search queries according to one or more embodiments disclosed herein is illustrated with reference to system 500 of FIG. 5, as further described in certain aspects with reference to FIGS. 6-8.

Figure 5:
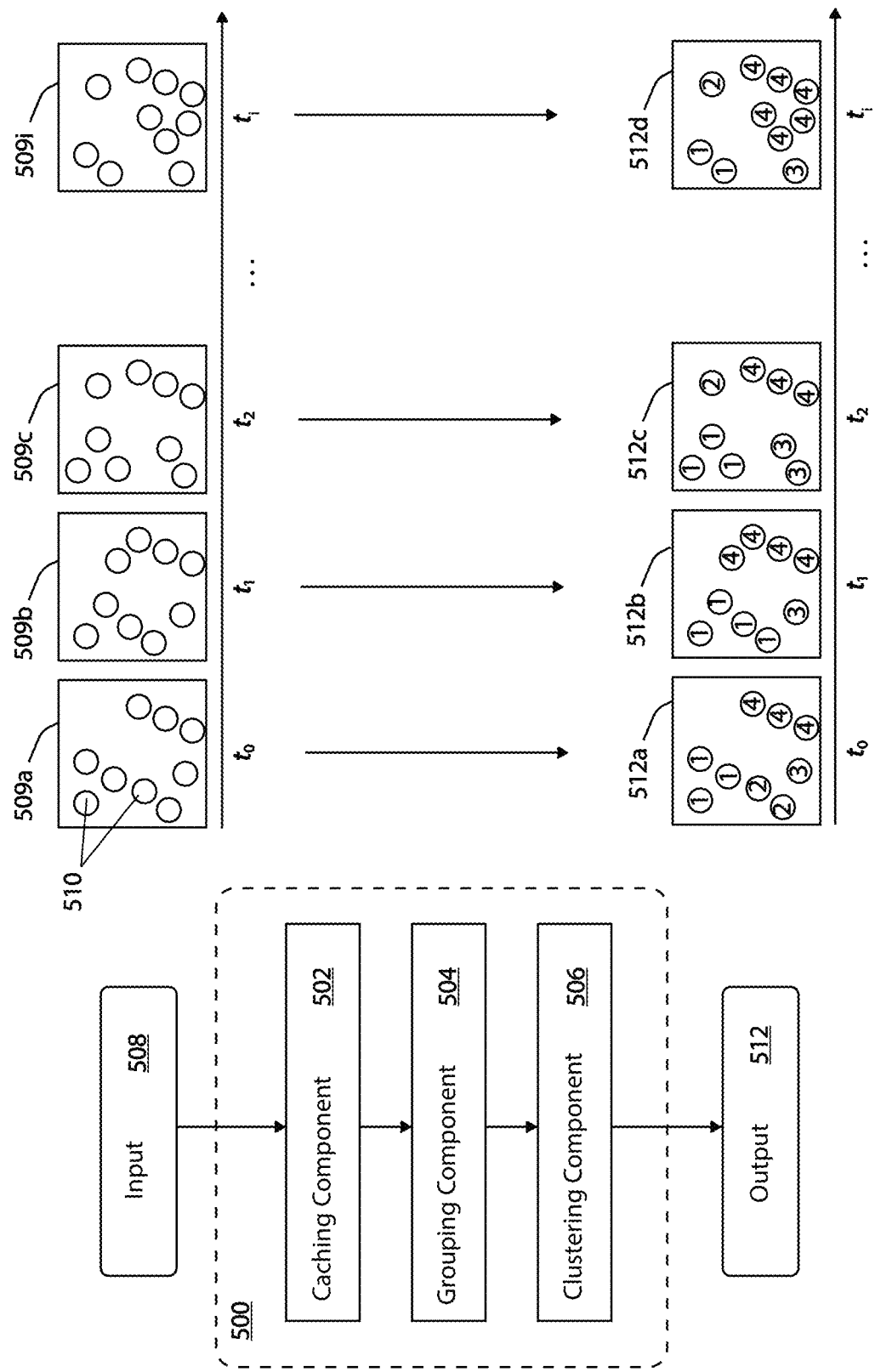
FIG. 5 is a component block diagram illustrating an example system for efficiently generating stable and effective clustered sets of user search queries, in accordance with one or more embodiments set forth herein.

With reference to FIG. 5, in general, system 500 may comprise caching component 502, grouping component 504 and clustering component 506. Generally, user searches and search information (described below) may be accessed and/or accessible by system 500 as input 508, and system 500 may be configured to generate and/or retrieve timestamp sets (e.g., 509a, 509b, 509c, or 509i) of news queries 510 (including associated news articles) for each timestamp (shown as timestamps $t_0$-$t_1$). In some embodiments, caching component 502 may store and make available for retrieval frequently accessed data in memory to reduce the computation time during text processing (e.g., embeddings generation), described in further detail below. Grouping component 504 may group news queries 510 based on feature similarity (e.g., URL-match) and time-window-based voting (the first stage of the embodiments described herein), as further described below. Then, clustering component 506 may calculate a time window-level, smoothed distance between each pair of groups in the set, using content features and a rolling average of constituent query distances, as further described below (the second stage of the embodiments described herein) and thereafter use the minimum of the constituent query distances as the final group distances to generate a cluster set of groups as output 512 (the timestamped versions shown as outputs 512a-d) via a clustering algorithm such as, for example, DBSCAN.

In general, user searches may comprise raw search terms (natural language or Boolean) submitted to a search engine by search engine users, together with related search information. Related search information may generally comprise contextual or other data relating to a user search such as, for example, user and user device data (e.g., user device IP address), date, timestamp, and search result data (e.g., number of search results returned to the user, URLs, titles, abstracts returned to the user, etc.) Such information may be stored in generally any suitable manner (e.g., in one or more tables, data stores, file systems, etc. of a search system).

In general, in the embodiments disclosed herein, one or more system components (e.g., system 500 components) may be configured to access/retrieve user searches (e.g., shown in FIG. 5 as input 508) and to create or generate user queries (e.g., news query 510) based on the user searches, using one or more text processing operations, in generally any manner sufficient to provide the functionality described herein. For example, in some embodiments, text processing operations may comprise one or more of sentence tokenization, word stemming, and embeddings generation (content and/or entity). In some embodiments, text processing information (results of text processing operations) may be retrieved from a caching component (e.g., caching component 502 of FIG. 5) in lieu of being generated, if the information had previously been generated and stored in the caching component and is currently accessible (e.g., not overwritten, as in a LRU type of cache). Text processing information may be previously generated and stored if, for example, the same search or search results (e.g. news articles) had previously been retrieved or accessed by system 500 in a prior operation, etc. In some embodiments, some or all of the text processing operations may be performed by a caching component (e.g., caching component 502); in some embodiments, some or all of the text processing operations may be performed by a grouping component (e.g., grouping component 504); in some embodiments, some or all of the text processing operations may be performed by another component or components of the query clustering system and/or by one or more components that are tightly or loosely coupled to the system.

Note that, unless context indicates otherwise, the search terms and queries referenced herein comprise news search terms and news queries. As used herein, a "news" query corresponds to a query comprising and/or comprised of a search term having news intent. News intent may generally be assessed in any suitable manner, and in general comprises any search term entered into the relevant search engine that triggers the search engine to return at least one news article—i.e., whose corresponding responsive information comprises at least one news article. In general, a news article may be any information denoted or otherwise treated as news information by the relevant search engine/search system.

In some embodiments, a query of the present embodiments (e.g., any news query 510 of timestep sets of news queries 509 in FIG. 5) may comprise a search term (e.g., "Cavs", "Orlando Magic", etc.) together with its corresponding news article information. In general, the news article information of a news query may comprise a new article URL for each of the search term's corresponding news articles. In some embodiments, corresponding news articles may comprise each news article returned or associated by a search engine in response to a search on the search term; in others, corresponding news articles may be a ranked list (up to a maximum number of articles, e.g., 6 articles) of news article returned or associated by a search engine in response to a search on the search term.

In some embodiments, a query of the present embodiments may also comprise a list of [title+abstract] pairs for each corresponding news article. In some embodiments, a news query of the present embodiments may also comprise news article content embeddings (e.g., embeddings of the title and abstract) and/or entity embeddings (e.g., entities derived from news article content).

In general, in the embodiments disclosed herein, the one or more system components (e.g., system 500 components) may also be configured to create or generate timestamp sets of user queries (e.g., sets 509a, 509b, 509c, or 509i), in generally any manner sufficient to provide the functionality described herein. In general, a "timestamp" set of queries may comprise and/or be comprised of news searches (search terms) submitted to a search engine by search engine users during a given time slot or time period (see, e.g., times slots $t_0$-$t_1$ in FIG. 5). In general, the relevant time slot or time period may be any suitable time slot or time period sufficient to provide the functions described herein. In some embodiments, the relevant time slot or time period is the most recent day; in some embodiments, the most recent ½ day; in some embodiments, the most recent 6 hours; in some embodiments, the most recent hour; in some embodiments, the most recent ½ hour; in some embodiments, the most recent 15 minutes; in some embodiments, the most recent 10 minutes; in some embodiments, the most recent 5 minutes.

Figure 6A:
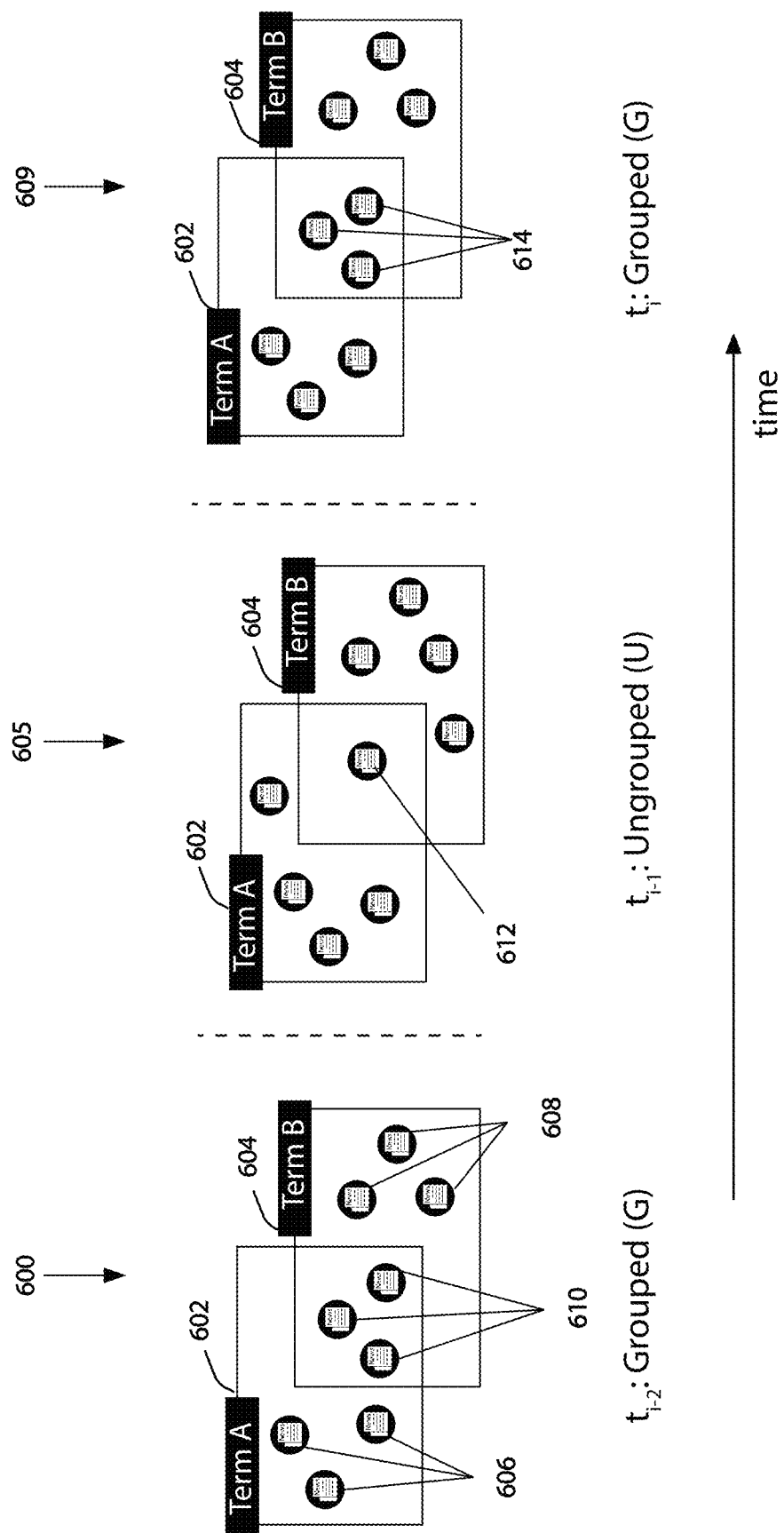
FIG. 6A is a component block diagram illustrating time instability in grouping of news queries, in accordance with one or more embodiments set forth herein.

In the first stage, grouping component 504 may determine group status/pairwise grouping status (i.e., determining whether a pair is grouped or ungrouped) for each query in a timestamp set of user queries (e.g., queries 510 in set 508a in FIG. 5). In some embodiments, for each query pair in the set (each query as paired with each other query in the set), the grouping determination may be made based on a feature similarity comparison between the pair of queries, and grouping the queries if the comparison meets and/or exceeds a predefined threshold. For example, as illustrated in FIG. 6A, at timestamp 600, exemplary query 602 may be compared for similarity to query 604 by, e.g., comparing the similarity of each query's associated news articles (at that timestamp) to the other query's news articles (at that timestamp), as illustrated by news articles 606, 608. As shown, those features (associated news article features) having sufficient similarity are represented as common articles 610.

In one or more embodiments, a timestamp-level grouping status of a pair of news queries in a timestamp set may be determined by evaluating whether the similarity of a first news query's news article features are sufficiently similar (i.e., meet a predefined condition) to the second news query's news article features. In some embodiments, the news article features to be evaluated may be each news article's URL, and the similarity may be assessed using Jacard similarity, using the formula:

$$\text{Jaccard}(\text{Set}_A, \text{Set}_B) = (\text{Set}_A \cap \text{Set}_B)/(\text{Set}_A \cup \text{Set}_B) \quad (1)$$

Where $\text{Set}_A$ is the set of URLs of the news articles of the first news query in the pair being evaluated, and $\text{Set}_B$ is the set of URLs of the news articles of the second news query in the pair being evaluated. In one or more embodiments, if the predefined similarity condition is met (e.g., the Jacard similarity is sufficiently high), the system may classify the pair as having a grouped timestamp-level grouping status, and if not, classifying the pair as having an ungrouped timestamp-level grouping status. In some embodiments, the system (system 500) may flag or otherwise set a timestamp-level grouping status parameter associated with the pair being evaluated to grouped (G) if the Jacard similarity of the pair's URLs is sufficiently high, and otherwise to ungrouped (U). In some embodiments, if the Jacard similarity is greater than 0.1, the system may classify the pair as having a grouped timestamp-level grouping status; in other embodiments, if the Jacard similarity is greater than 0.2; in other embodiments, if the Jacard similarity is greater than 0.25.

In one or more embodiments disclosed herein, the relevant query feature for determining groups (e.g., query associated news article, URLs)) may be relatively temporally unstable, in that the feature may vary or change at different timestamps. For example, in the embodiments where the feature is associated news articles, the news articles associated with a given query may change (e.g., be different articles or comprise changed content/URLs) over time and thereby affect the stability of groupings over time. For example, as shown in FIG. 6A, at timestamp 600, as shown, three news articles 610 satisfy the relevant similarity condition (e.g., the Jacardy similarity described above) and the queries 602 and 604 may therefore be considered to be grouped by the system (assuming in the embodiment that the system is configured such that three similar features meets the grouping condition). However, at timestamp 605, the associated news articles for queries 602 and 604 have changed sufficiently to cause the common news articles to fall to a single article, as shown by news article 612, and the system may therefore consider queries 602 and 604 to be ungrouped at that time (assuming in the embodiment that the system is configured such that one similar feature fails to meet the grouping condition). Further, at timestamp 609, the associated news articles for queries 602 and 604 have changed again sufficiently cause the common news articles to rise to three articles, as shown by news articles 614.

Because of the aforementioned relative temporal instability, in some embodiments, the system and methods may, at each timestamp, base the grouping determination not just on the query information or features present at that timestamp (such evaluations referred to as "timestamp-level" evaluations or determinations), but also query information or features of the query pair present in the preceding one or more timestamp sets—such evaluations referred to as "window-level" evaluations or determinations. The inclusion of prior/historical query information may serve to temporally stabilize grouping determinations at each timestamp, in the manner of a rolling average-type of stabilization.

In some embodiments, a window-level type of grouping determination may be made for each query pair in a timestamp set of new queries utilizing a voting or similar routine that combines (e.g., blends, averages, etc.) the current timestamp-level grouping status of the pair with the pair's timestamp-level grouping status at one or more prior time slots (e.g., a window-level status measure). In this manner, a window-level effect and accompanying time stability may be achieved algorithmically. It may be noted that, as used herein, the term "time-stable set of news query groups" or "time-stable set of groups" refers to, for any given timestamp set, those query pairs having a window-level group status of grouped, with the following exception: any news query in a given timestamp set that fails to be classified as grouped with any other news query of the timestamp set may be considered a single query group (see, e.g., group 704 in FIG. 7A) and may be included in the time-stable set of groups for the timestamp set.

Figure 6B:
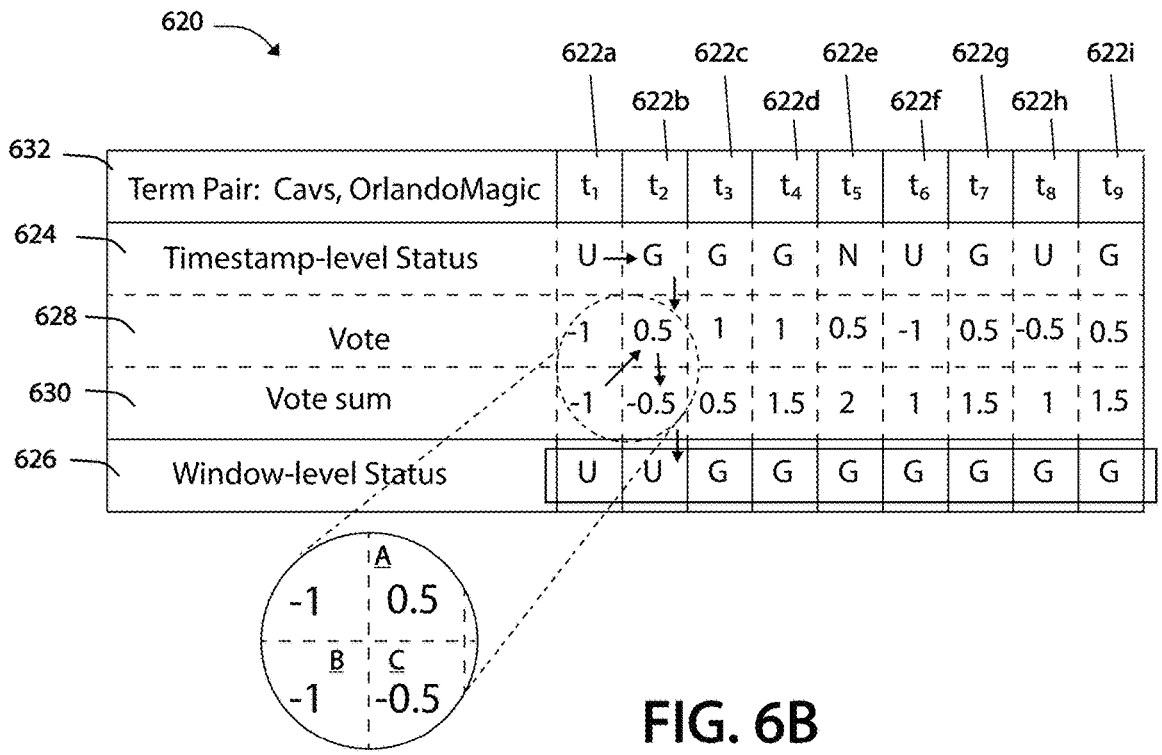
FIG. 6B is a component block diagram illustrating a table demonstrating a voting routine for determining window-level grouping status of news searches, in accordance with one or more embodiments set forth herein.
Figure 6C:
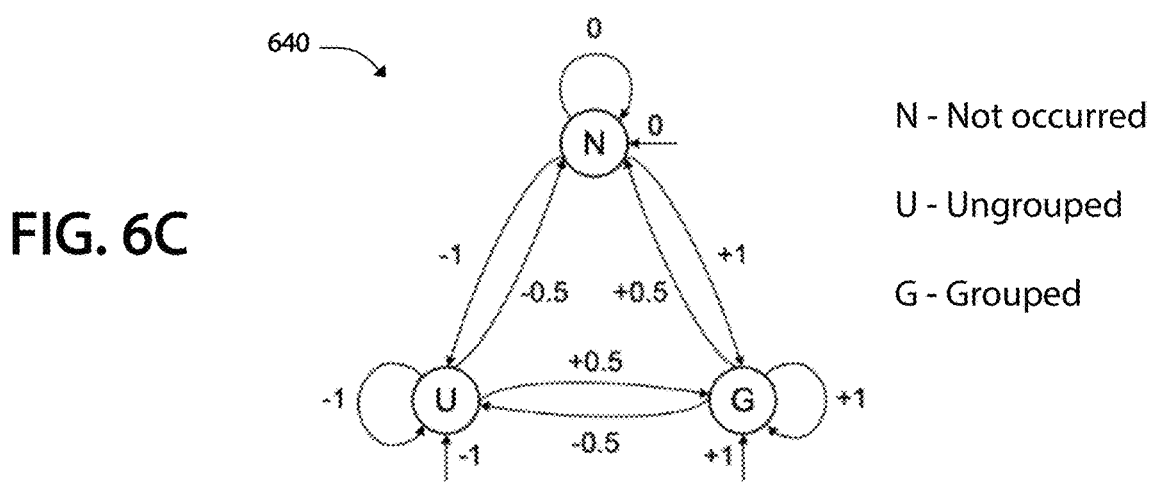
FIG. 6C is a component block diagram illustrating a state machine providing a set of rules for determining voting scores in the routine shown in FIG. 6B, in accordance with one or more embodiments set forth herein.

In some embodiments, a voting routine may be used that assigns values (votes) based on current and prior timestamp-level statuses for a query pair, and tallies the votes in the current timestamp (time slot) to arrive at a window-level grouping status (grouped or ungrouped) for the pair in that timestamp. In general, any voting routine sufficient to provide the functionality disclosed herein may be utilized. One exemplary voting routine implemented in some embodiments herein is illustrated by FIGS. 6B and 6C. Referring to FIG. 6B, table 620 illustrates nine consecutive timestamped columns 622a-622i, setting forth grouping evaluation information at each timestamp for a query pair having query terms 632 ("Cavs" and "Orlando Magic"). As may be seen, relevant grouping evaluation information at each timestamp may comprise timestamp-level group determination/status 624 for the pair, window-level group determination/status 626 for the pair, timestamp-level vote/score 628, and window-level vote sum/score 630. As an ordinary observer of FIG. 6B may appreciate, the routine illustrated by table 620 may comprise: (i) determining a timestamp-level group status for the term pair 632 and associated vote/score, for the current timestamp (e.g., cell "A" in FIG. 6B); (ii) retrieving the prior window-level group status vote sum for the pair (e.g., cell "B") and summing with the current timestamp-level group vote/score (cell "A") to arrive at a new/current window-level group status vote sum (cell "C"); and (iii) assigning a new/current window-level grouping status (e.g. grouped or ungrouped) based on the new/current window-level grouping status vote sum.

In general, any voting rules may be used in embodiments disclosed herein that are sufficient to provide the functionality described herein. In some embodiments, the voting rules may be those illustrated by state machine 640 in FIG. 6C, or any similar simple voting rules. As may be seen in FIG. 6C, a single vote, a half vote, and/or a vote of zero (no change) may be allocated to the current timestamp (see vote 628 in table 620) based on the change in current timestamp-level group status (U, G, or N) (see timestamp-level status 624 in table 620) as compared with the prior timestamp-level group status. Each timestamp-level group status (U, G, or N) may be determined according to a pairwise query feature similarity evaluation for the query pair (e.g., pair 632) at each timestamp (for each timestamp set for the pair), such as that described above in relation to FIG. 6A (note that status "N" denotes that, for that time slot, the query pair is not present in the timestamp set). For each time slot, the current timestamp-level vote (i.e., vote 628) may be added to the trailing vote sum 630 to arrive at a current vote sum 630, and a window-level status 626 determined based on the current vote sum. For example, in the embodiment illustrated in FIGS. 6B and 6C, a window-level status 626 of ungrouped (U) may be determined if the current vote sum 630 is a negative number, and a window-level status 626 of grouped (G) may be determined if the current vote sum is a positive number.

In the second stage of the two-stage clustering technique of the embodiments disclosed herein, clustering component 506 may determine time-stable distances between each pair of news queries (between each pair of news query search terms) in the time-stable set of groups, and utilize these distances to determine group clusters, generally as follows. A timestamp-level group distance, t-dist$_{group}$, may be determined for each pair of groups in the time-stable set of groups, and this group distance (or a multiple thereof) may be assigned as the timestamp-level query-pair distance, t-dist$_{wi,wj}$, between each news query of one group in a pair and each news query in the other group of the pair. Then, a window-level query-pair distance may be determined based on a rolling average of the timestamp-level query-pair distances. Then, in some embodiments, a final, time-stable group distance between each pair of groups may be determined based on the minimum window-level query-pair distance of the constituent window-level query-pair distances. Utilizing this final time-stable group distance, the system may generate a set of group clusters. In some embodiments, a service such as a website may reference the group clusters to generate, e.g., a trending news list for display to users.

Figure 7A:
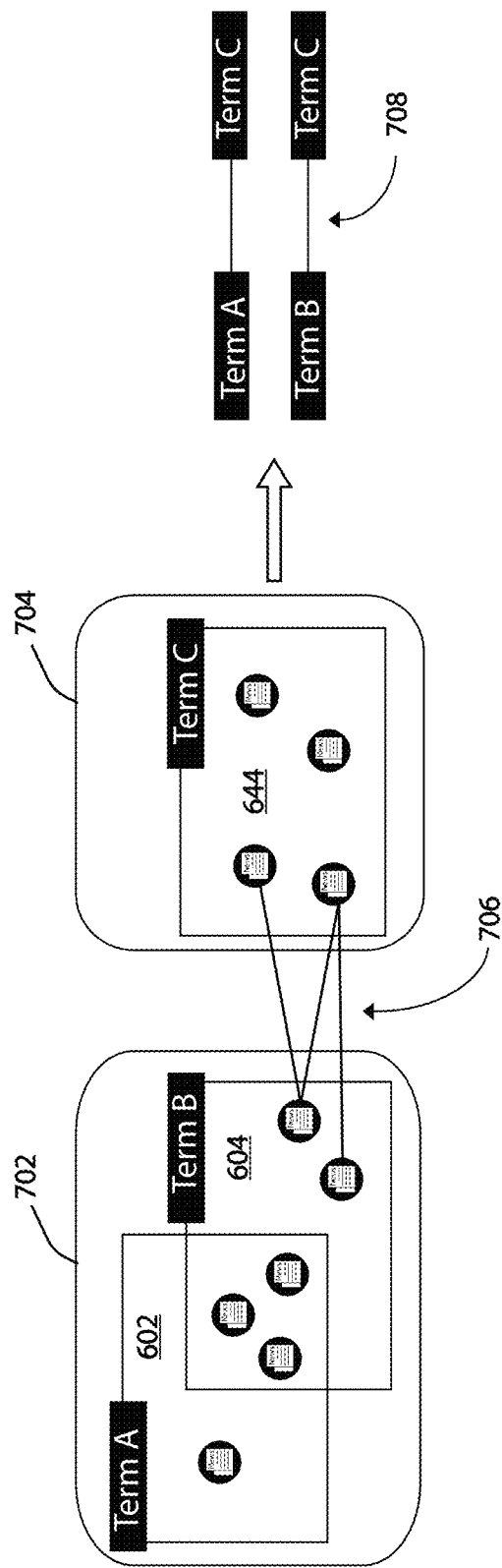
FIG. 7A is a component block diagram illustrating determining timestamp-level group distance and query pair distance between two exemplary groups, in accordance with one or more embodiments set forth herein.

More particularly, in one or more embodiments described herein, timestamp-level group distance, t-dist$_{group}$, between each pair of groups of the time-stable set of groups may be calculated in the manner illustrated in FIG. 7A. As shown in FIG. 7A, exemplary group 702 comprises queries 602 and 604, each comprising a search term (e.g., "Term A" and "Term B") and associated news articles and information (e.g. news articles, as shown), whereas exemplary group 704 comprises query 644 (e.g., "Term C" and associated news articles and information). In some embodiments, the timestamp-level group distance, t$_{dist}$, between each pair of groups (e.g., groups 702 and 704) may be determined by taking the average of the top-k minimum article distances between each pair of groups. As shown in FIG. 7A, when k is set to three, the top 3 article distances 706 may be averaged and this average distance set as the timestamp-level group distance, t$_{dist}$ for the pair of groups (e.g. groups 702 and 704). In some embodiments, the timestamp-level group distance may be set to the minimum article distance (i.e., k=1) between each pair of groups. In other embodiments, k may be set to a number between 2 and 10; in others, a number between 2 and 6.

In general, any suitable manner of calculating feature distance sufficient to provide the functionality described herein may be utilized in the disclosed embodiments to calculate article distances. In one or more embodiments, in which the features are news articles, the title and abstract of each news article may be vectorized as content embeddings using a pre-trained language model, and article distance between each pair of articles (e.g., distances 706) may be calculated as the vector distance (e.g., cosine similarity) between the two article vectors. In some embodiments, entities (e.g., name entities) may be extracted from each article's content and entity embeddings may be generated (using, e.g., a knowledge graph) and distance (e.g., cosine similarity) calculated between entities in each pair of articles. In one or more embodiments, article distance between each pair of articles may be calculated as the cosine similarity between the articles' content embeddings. In some embodiments, article distance between each pair of articles may be calculated as the product of the content embedding cosine similarity and entity embedding cosine similarity between the articles, as shown by the following equation:

$$\text{news\_dist} = \text{content\_dist} \times \text{entity\_dist}^n \quad (2)$$

where n may equal, in some embodiments, a value between 1 and 5; in some embodiments, a value between 1 and 3; in some embodiments, n equals 1.8.

Figure 7B:
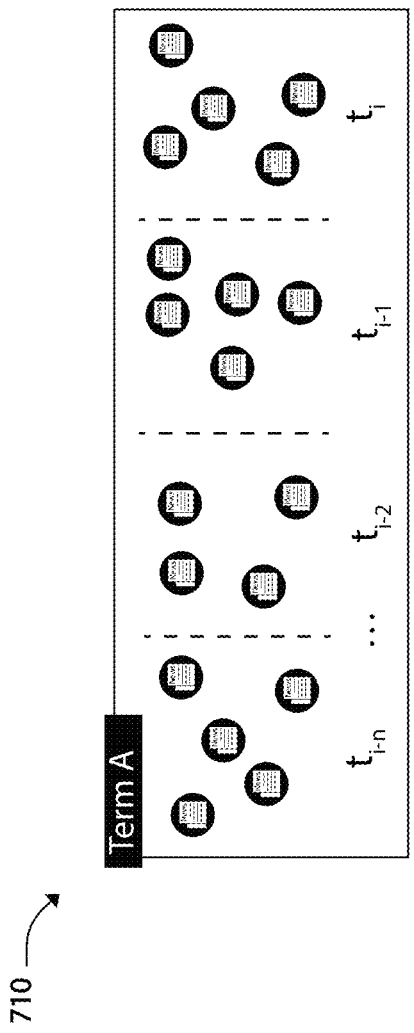
FIG. 7B is a component block diagram illustrating a time-enriched or window variation of a news query, in accordance with one or more embodiments set forth herein.

In some embodiments, instead of using a query's corresponding articles at each timestamp in stage two techniques described herein, in order to provide additional time stabilization of results, the pool of associated articles for each query may be extended to include a window of associated articles—i.e., the pool of associated articles for each query that are available for stage two techniques may be extended to include not only the associated articles for the query at that timestamp, but also to include associated articles for the query from one or more prior timestamps, as illustrated by query 602 window 710 in FIG. 7B.

It may be noted that in some embodiments, as described above, the system may comprise a caching component (e.g., caching component 502), and news query features (e.g., content and entity embeddings) may be generated for a news search and stored in the caching component, and thereafter retrieved for subsequent operations involving the news query, such as the second stage operations described herein, thereby saving the processing time and cost involved with generating news query features.

Next, for each query in a group (e.g., query 602 and 604 of group 702 and query 644 of group 704, in FIG. 7A) the embodiments herein may determine (e.g., assign or set) the timestamp-level group distance between the two groups, t-dist$_{group}$, calculated as described above (or in some embodiments a multiple thereof) as the timestamp-level "query-pair distance" between each constituent query pairs from the two groups, t-dist$_{wi,wj}$, as shown in FIG. 7A by distance 708. Stated differently, the distance between each news query of one group and each news query of the other group in a pair of groups being evaluated may be set to the timestamp-level group distance between the groups, t-dist$_{group}$, or in some embodiments a multiple thereof. With respect to FIG. 7A, for example, the distances (distance 708) between Term A and C and Term B and C (the constituent news query pairs) may be set to the timestamp-level group distance between the groups (groups 702 and 704). In some embodiments, for each group in a timestamp query set, the timestamp-level group distance between the group and another group (or a multiple thereof) may be assigned to all query pairs between the two groups (all constituent queries). In this manner distance fluctuation between query pairs may be reduced.

Figure 8:
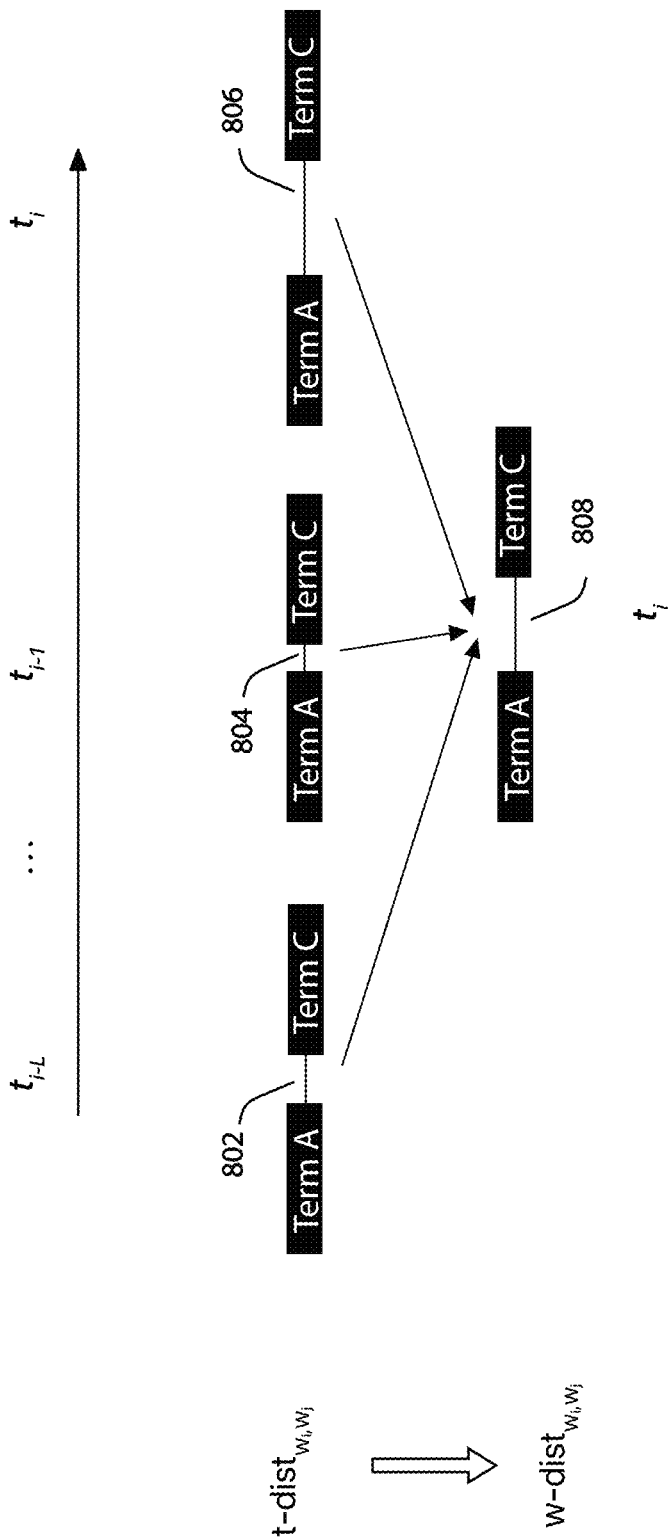
FIG. 8 is a component block diagram illustrating calculating a rolling average for a window-level query pair distance, in accordance with one or more embodiments set forth herein.

With reference to FIG. 8, for each query-pair in a timestamp news query set, a window-level query-pair distance, w-dist$_{wi,wj}$, (distance 808) may be determined for the query-pair as the rolling average of the timestamp-level query-pair distances, t-dist$_{wi,wj}$, calculated as previously described. For example, as shown in FIG. 8, the current window-level query-pair distance between Term A and Term C is set as the rolling average of timestamp-level query-pair distances (e.g., average of distances 802, 804, and 806, corresponding to timestamp-level query-pair distances for timestamps, $t_{i-L}$, . . . $t_{i-1}$, and $t_i$, respectively). In this manner, more smoothing (less temporal fluctuation) of query-pair distance may be achieved to aid with stable clustering.

Then, in some embodiments, for each pair of groups in a time-stable set of news query groups, the minimum of window-level query-pair distances, w-dist$_{wi,wj}$, for each constituent query pair of the pair of groups may be identified by the system (by, e.g., clustering component 506) and thereafter the system may determine a final group distance for each pair of groups in the time-stable set of news query groups based on the minimum window-level query-pair distance associated with the pair. In some embodiments, the final group distance may be equal to the identified minimum distance. In others, it may be a multiple thereof.

Once having determined each final group distance for each group pair of a timestamp query set, in the manner set forth above, a clustering technique may be performed (by, e.g., the clustering component 506) to cluster the groups utilizing the final group distances. In general, any sufficient clustering technique may be employed sufficient to provide the functionality described herein. For example, in some embodiments, DBSCAN (a density-based unsupervised clustering technique) may be utilized to cluster the groups by setting the distance threshold parameter of DBSCAN, ε, as the set of final group distances, resulting in a stable cluster set of groups. This cluster set may serve as input for downstream uses, such as, e.g., generating a ranked list of current search queries.

Figure 9A:
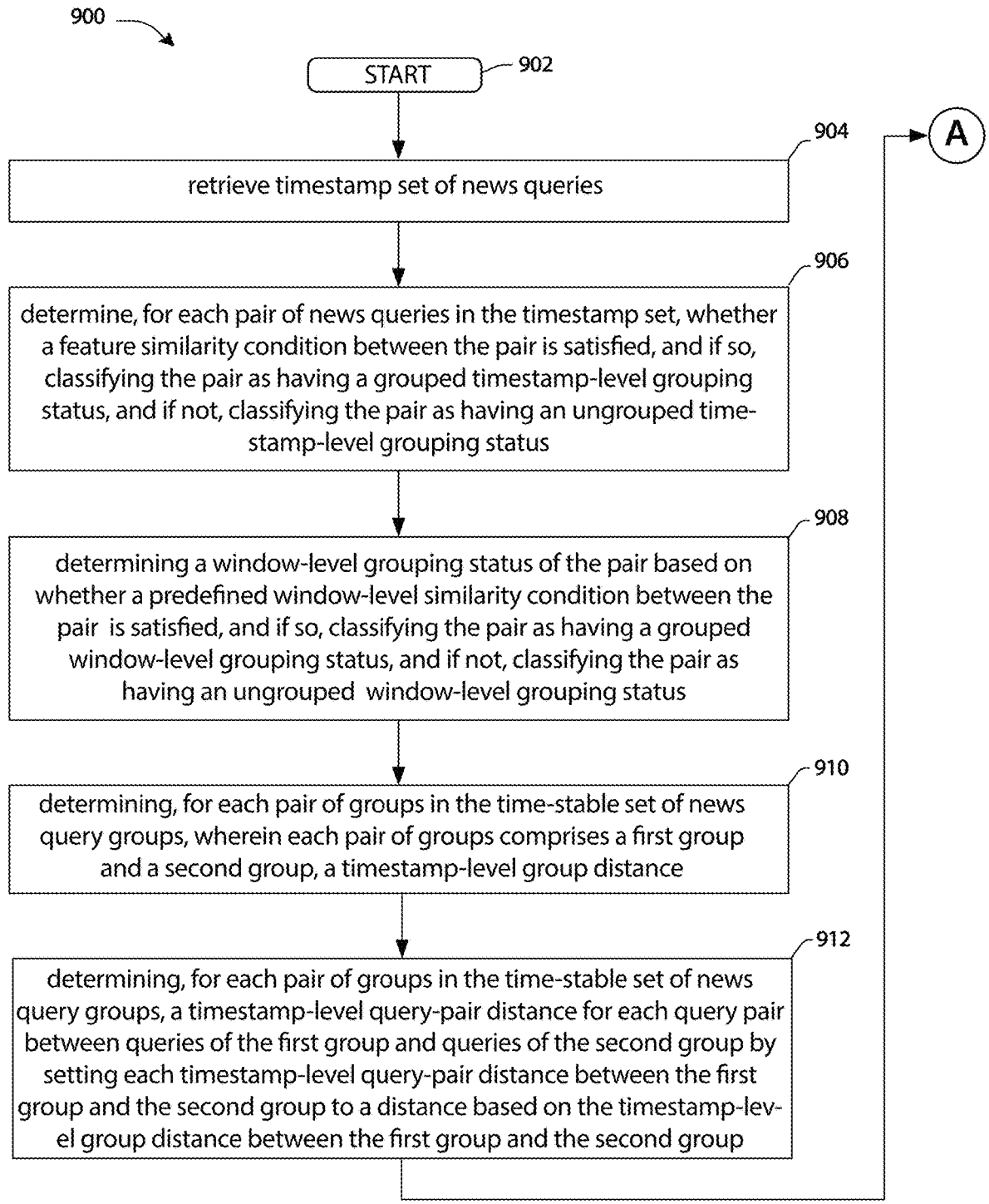
FIG. 9A is a portion of a flow chart illustrating an example method for efficiently generating stable and effective clustered sets of user search queries, in accordance with one or more embodiments set forth herein.
Figure 9B:
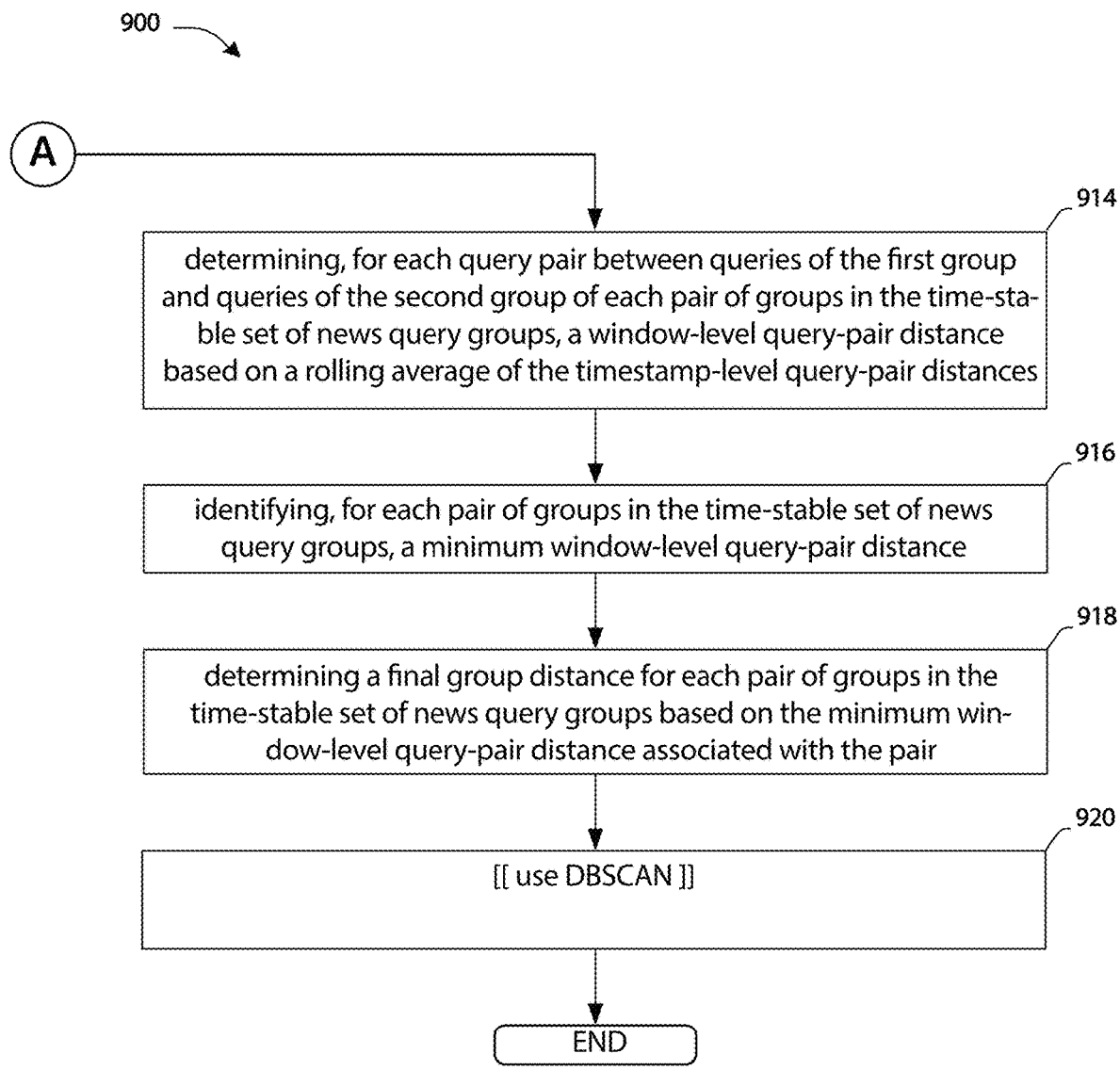
FIG. 9B is a portion of a flow chart illustrating an example method for efficiently generating stable and effective clustered sets of user search queries, in accordance with one or more embodiments set forth herein.

An embodiment of generating stable and effective clustered sets of user search queries is illustrated by example method 900 of FIG. 9. At 902 the method 900 starts. At 904 a timestamp set of news queries may be retrieved/accessed (directly or indirectly) by a grouping component (e.g., grouping component 504 of FIG. 5) of a search clustering system (e.g., system 500). In general, a "timestamp" set of news queries may comprise and/or be comprised of news searches (search terms) submitted to a search engine by search engine users during a given time slot or time period. In some embodiments, the users (or user devices) may correspond to those users in a given geographic area (e.g., a country, state, province, local area, etc.) In some embodiments, the users may correspond to those users belonging to one or more demographic categories (e.g., age, sex, etc.) and/or user attribute categories (e.g., dog owners, sports enthusiasts, etc.). In general, the relevant time slot or time period may be any suitable time slot or time period sufficient to provide the functions described herein. In some embodiments, the relevant time slot or time period is the most recent day; in some embodiments, the most recent ½ day; in some embodiments, the most recent 6 hours; in some embodiments, the most recent hour; in some embodiments, the most recent ½ hour; in some embodiments, the most recent 15 minutes; in some embodiments, the most recent 10 minutes; in some embodiments, the most recent 5 minutes.

In general, as used herein, a "news" query corresponds to a query comprising and/or comprised of a search term having news intent. News intent may generally be assessed in any suitable manner, and in general comprises any search term entered into the relevant search engine that triggers the search engine to return at least one news article. In some embodiments, search engine search logs may be filtered for user search terms entered into the search engine during the relevant timestamp (time period) that triggered a news response (e.g., return of news article results). In some embodiments, search engine search logs may also be filtered for, e.g., popularity (number of clicks or instances, etc.). In some embodiments, the timestamp set of news queries may be filtered to comprise a top percentage or number (e.g., 100) of a ranked list (ranked by popularity, etc.) of news searches during the relevant time slot.

In some embodiments, one or more text processing operations may be applied to raw search results (e.g. one or more logs, databases, data stores, etc. comprising raw search data) in a timestamp (time slot) to build and/or make accessible a timestamp set of news queries. In some embodiments, text processing techniques may comprise one or more of sentence tokenization, word stemming, and embeddings (content and/or entity) generation. In some embodiments, text processing information (results of text processing) may be retrieved from a caching component (e.g., caching 502 of FIG. 5) in lieu of being generated, if the information had previously been generated and stored in the caching component and is currently accessible (e.g., not overwritten, as in a LRU type of cache). Text processing information may be previously generated and stored if, for example, the same search or search results (e.g. news articles) had previously been retrieved or accessed by system 500 in a prior timestamp operation, etc. In some embodiments, some or all of the text processing operations may be performed by the grouping component (e.g., grouping component 504); in some embodiments, some or all of the text processing operations may be performed by another component or components of the query clustering system and/or by one or more components that are tightly or loosely coupled to the system.

In some embodiments, a news query of the present embodiments (e.g., any news query 510 of timestep sets of news queries 509 in FIG. 5) may comprise a search term (e.g., "Cavs", "Orlando Magic", etc.) together with its corresponding news article information. In general, the news article information of a news query may comprise a new article URL for each of the search term's corresponding news articles. In some embodiments, corresponding news articles may comprise each news article returned or associated by a search engine in response to a search on the search term; in others, corresponding news articles may be a ranked list (up to a maximum number of articles, e.g., 6 articles) of news article returned or associated by a search engine in response to a search on the search term.

In some embodiments, a news query of the present embodiments may also comprise a list of [title+abstract] pairs for each corresponding news article. In some embodiments, a news query of the present embodiments may also comprise news article content embeddings (e.g., embeddings of the title and abstract) and/or entity embeddings (e.g., entities derived from news article content).

At 906, for each pair of news queries in the timestamp set (e.g. set 509*a* of FIG. 5), a timestamp-level grouping status may be determined by the system (e.g., system 500). In some embodiments, the determination is made by evaluating whether a predefined feature similarity condition between the pair is satisfied. In some embodiments, the grouping component of the system (e.g., grouping component 504) may make the determination. If the predefined condition is satisfied, the system classify the pair as having a grouped timestamp-level grouping status, in generally any suitable manner. For example, in some embodiments, the system may set a timestamp-level grouping status indicator or parameter associated with the pair to grouped (G), or similar. Otherwise, the predefined condition being unsatisfied, the system may classify the pair as having an ungrouped timestamp-level grouping status. In some embodiments, the system may set a timestamp-level grouping status indicator or parameter associated with the pair to ungrouped (U), or similar.

In some embodiments, the predefined feature similarity condition used by the system may be a Jacard similarity index of the associated set of news article URLs in each news query of the pair of queries being evaluated, as described above in relation to equation (1). In one or more embodiments, the system (system 500) may flag or otherwise denote the pair being evaluated as having a grouped status if the Jacard similarity of the pair's URLs is sufficiently high. In some embodiments, if the Jacard similarity is greater than 0.1, the system may flag or otherwise denote the pair being evaluated as having a grouped status; in other embodiments, if the Jacard similarity is greater than 0.2; in other embodiments, if the Jacard similarity is greater than 0.25.

At 908, for each pair of news queries in the timestamp set (e.g. set 509*a* of FIG. 5), a window-level grouping status may be determined by the system (e.g., system 500). In some embodiments, the determination may be based on whether a predefined window-level similarity condition between the pairs is satisfied and if so, classifying the pair as having a grouped window-level grouping status, and if not, classifying the pair as having an ungrouped window-level grouping status. In some embodiments, the determination may be made utilizing a voting or similar routine to combine (e.g., blend, average, etc.) the current timestamp-level group status of the pair with the pair's timestamp-level grouping status at one or more prior time slots (e.g., a window-level status measure). In some embodiments, the grouping component of the system (e.g., grouping component 504) may make the determination. Further description and exemplary routines for determining window-level group status of a query pair are set forth above, in the description accompanying FIGS. 6B and 6C. It may be noted that, as used herein, the term "time-stable set of news query groups" or "time-stable set of groups" refers to, for any given timestamp set, those query pairs having a window-level group status of grouped, with the following exception: any news query in a given timestamp set that fails to be classified as grouped with any other news query of the timestamp set may be considered a single query group (see, e.g., group 704 in FIG. 7A) and may At 910, each group in the time-stable set of news query groups may be evaluated in relation to each other group in the set (each of such evaluations characterized as a "pair" of groups in the set) as follows. For each pair of groups, the system (e.g., system 500) may determine a timestamp-level group distance. In some embodiments, the determination is made based on a content distance measure between the groups' news articles (news articles of each group's constituent news queries). In some embodiments, the clustering component of the system (e.g., clustering component 506) may make the determination.

In some embodiments, the timestamp-level group distance, $t_{dist}$, between each pair of groups (e.g., groups 702 and 704) may be determined by taking the average of the top-k minimum article distances between each pair of groups. As shown in FIG. 7A, when k is set to three, the top 3 article distances 706 may be averaged and this average distance set as the timestamp-level group distance, $t_{dist}$ for the pair of groups (e.g. groups 702 and 704). In some embodiments, the timestamp-level group distance may be set to the minimum article distance (i.e., k=1) between each pair of groups. In other embodiments, k may be set to a number between 2 and 10; in others, a number between 2 and 6.

In general, any suitable manner of calculating feature distance sufficient to provide the functionality described herein may be utilized in the disclosed embodiments to calculate article distances. In some embodiments, the news articles used for the distance measure are not limited to those of the relevant timestamp, but may include news articles of one or more prior timestamps. Further details of this are described above in relation to FIGS. 7A and 7B, and equation 2.

At 912, in some embodiments, for each pair of groups in the time-stable set of news query groups, the system may determine a timestamp-level query-pair distance (e.g., distance 708 of FIG. 7A) between each news query in a first group of the pair of groups and each news query in the second group of the pair of groups. In one or more embodiments, the system may set each timestamp-level query-pair distance to be a value based on the timescale-level group distance between the pair of groups; in some embodiments, the system may set each timestamp-level query-pair distance to be equal to the timestamp-level group distance between the pair of groups; in other embodiments, the system may set each timestamp-level query-pair distance equal to a multiple of the timestamp-level group distance. Further details of this are described above, in the description relation to FIG. 7A.

At 914, for each pair of groups in the time-stable set of news query groups, the system may determine a window-level query-pair distance. In some embodiments, the determination is made based on a rolling average of the timestamp-level query-pair distances. In some embodiments, the clustering component of the system (e.g., clustering component 506) may make the determination. Further details of this are described above, in relation to FIG. 8.

At 916, in some embodiments, for each pair of groups in the time-stable set of news query groups, the minimum of window-level query-pair distances, w-dist$_{wi,wj}$, for each constituent query pair of the pair of groups may be identified by the system (by, e.g., clustering component 506).

At 918, in some embodiments, the system may determine a final group distance for each pair of groups in the time-stable set of news query groups based on the minimum window-level query-pair distance associated with the pair. In some embodiments, the final group distance may be equal to the identified minimum distance. In others, it may be a multiple thereof.

At 920, in some embodiments, once having determined each final group distance for each group pair of the time stable query group timestamp query set, in the manner set forth above, a clustering technique may be performed (by, e.g., the clustering component 506) to cluster the groups utilizing the final group distances. In general, any sufficient clustering technique may be employed sufficient to provide the functionality described herein. For example, in some embodiments, DBSCAN (a density-based unsupervised clustering technique) may be utilized to cluster the groups by setting the distance threshold parameter of DBSCAN, $\varepsilon$, as the set of final group distances, resulting in a stable cluster set of groups.

Figure 10:
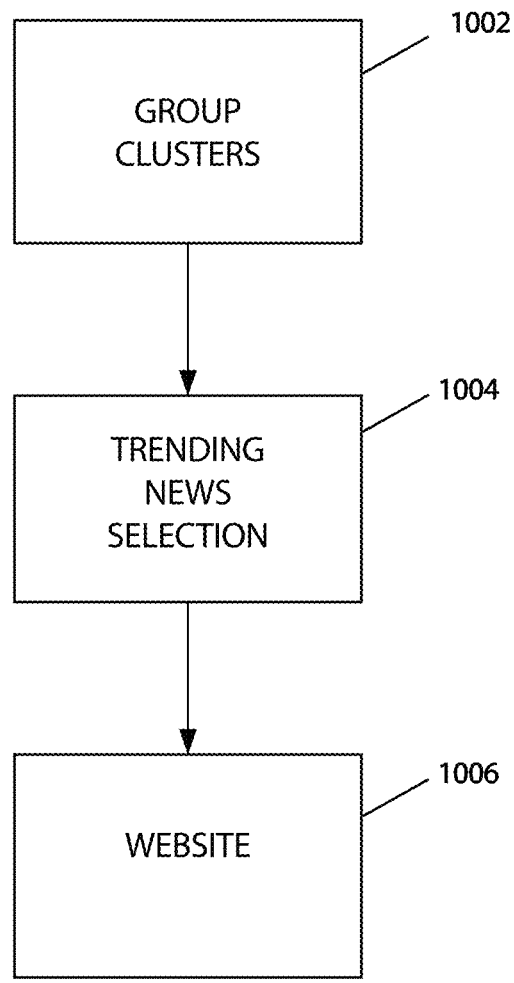
FIG. 10 is an illustration of a scenario featuring an example non-transitory machine-readable medium in accordance with one or more embodiments set forth herein.

In some embodiments, a cluster set generated as set forth the above may serve as input for downstream processes or uses. For example, and with reference to FIG. 10, a block diagram illustrating a use of the group clusters generated by the embodiments disclosed herein, group cluster set 1002 may be served to a component 1004 that is configured to generate and serve a ranked list of trending news items using popular search terms. Web platform 1006 may retrieve a trending news list from component 1004 and include it as, e.g., a portion of a display screen, such as website 400 of FIG. 4.

Figure 11:
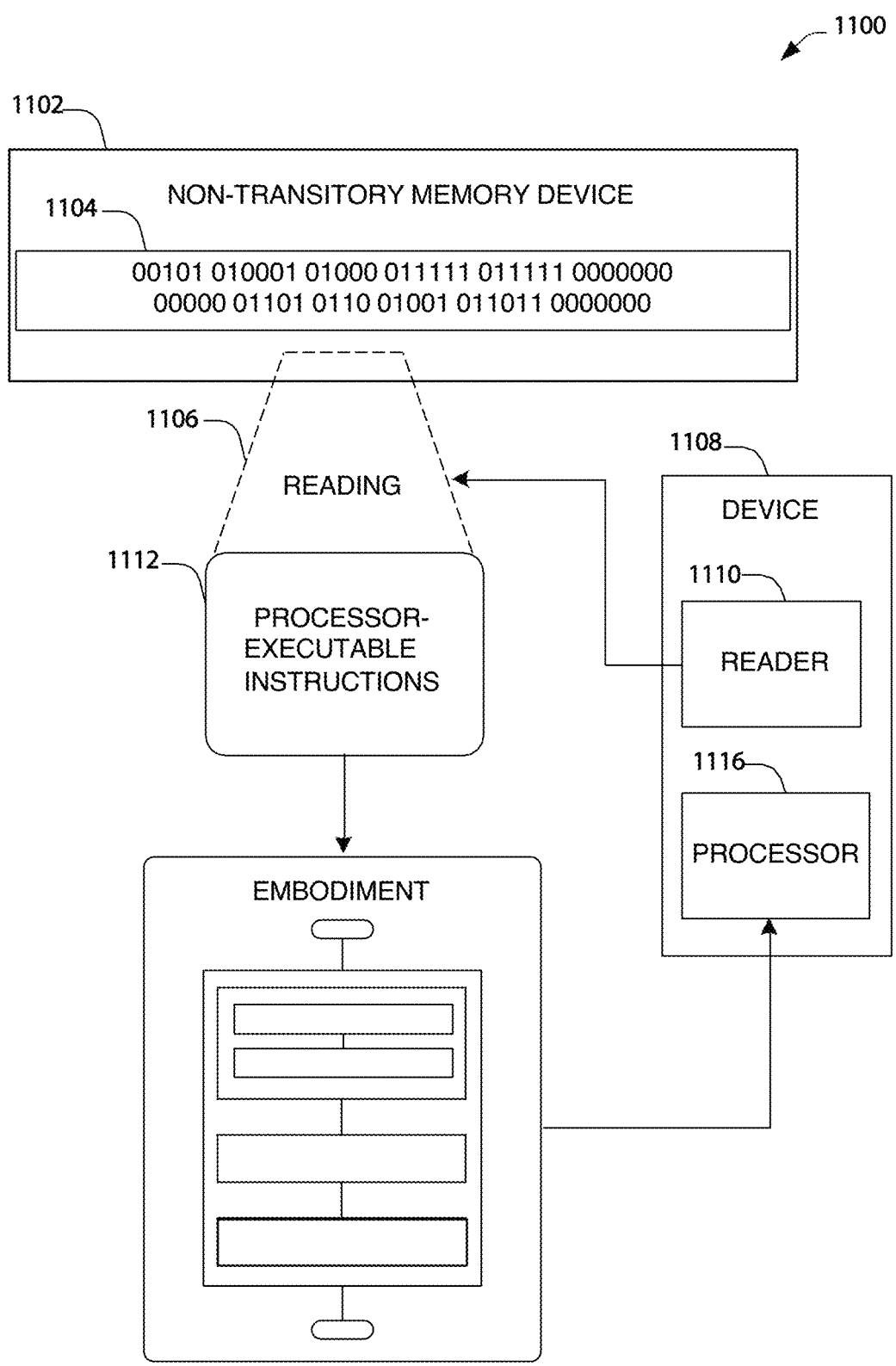
FIG. 11 is an illustration of a scenario involving an example non-transitory machine-readable medium in accordance with one or more embodiments set forth herein.

FIG. 11 is an illustration of a scenario 1100 involving an example non-transitory machine readable medium 1102. The non-transitory machine readable medium 1102 may comprise processor-executable instructions 1112 that when executed by a processor 1116 cause performance (e.g., by the processor 1116) of at least some of the provisions herein. The non-transitory machine readable medium 1102 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 1102 stores computer-readable data 1104 that, when subjected to reading 1106 by a reader 1110 of a device 1108 (e.g., a read head of a hard disk drive, or a read operation invoked on a solid-state storage device), express the processor-executable instructions 1112. In some embodiments, the processor-executable instructions 1112, when executed cause performance of operations, such as at least some of the example method 900 of FIG. 9, for example. In some embodiments, the processor-executable instructions 1112 are configured to cause implementation of a system, such as at least some of the example system 500 of FIG. 5, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" and/or the like is used herein to mean serving as an example, instance, illustration, etc., and not necessarily as advantageous. As used herein, "or" is intended to mean an inclusive "or" rather than an exclusive "or". In addition, "a" and "an" as used in this application are generally construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In some embodiments, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above-described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
   retrieving, by a grouping component of a search clustering system, a timestamp set of news queries;
   determining, by the grouping component, a time-stable set of news query groups from the timestamp set of news queries by:
   determining, for each pair of news queries in the timestamp set of news queries, whether a predefined feature similarity condition between the pair is satisfied and, if so, classifying the pair as having a grouped timestamp-level grouping status, and if not, classifying the pair as having an ungrouped timestamp-level grouping status;
   determining a window-level grouping status of the pair based on whether a predefined window-level similarity condition between the pair is satisfied and if so, classifying the pair as having a grouped window-level grouping status, and if not, classifying the pair as having an ungrouped window-level grouping status,
   wherein the time-stable set of news query groups comprises a set of news query pairs in the timestamp set of news queries having a window-level grouping status classification indicative of being grouped;
   determining, by a clustering component of the search clustering system, a time-stable set of news query group clusters by:
   determining a timestamp-level group distance for each pair of groups in the time-stable set of news query groups, wherein each pair of groups comprises a first group and a second group;
   determining, for each pair of groups in the time-stable set of news query groups, a timestamp-level query-pair distance for each query pair between queries of the first group and queries of the second group by setting each timestamp-level query-pair distance between the first group and the second group to a distance based on the timestamp-level group distance between the first group and the second group;
   determining, for each query pair between queries of the first group and queries of the second group of each pair of groups in the time-stable set of news query groups, a window-level query-pair distance based on a rolling average of the timestamp-level query-pair distances;
   identifying, for each pair of groups in the time-stable set of news query groups, a minimum window-level query-pair distance;
   determining a final group distance for each pair of groups in the time-stable set of news query groups based on the minimum window-level query-pair distance associated with the pair; and
   clustering, by the clustering component, the time-stable set of news query groups, using the final group distances.

2. The method of claim 1 wherein determining whether a predefined feature similarity condition is satisfied comprises calculating a Jacard similarity index using a first and second set of URLs, wherein the first and second sets of URLs correspond, respectively, to a first and second set of news articles of a first and second news query of the pair of news queries.

3. The method of claim 1 wherein determining a window-level grouping status comprises performing, by the grouping component, a voting routine that combines a current timestamp-level grouping status of the pair with the pair's timestamp-level grouping status at one or more prior time slots.

4. The method of claim 1, wherein determining the timestamp-level group distance comprises determining, for each news article of the first group, news distance to each news article of the second group, wherein news distance is determined based on cosine similarity of news article content and entity embeddings.

5. The method of claim 1, wherein determining a final group distance for each pair of groups comprises setting the final group distance for each pair of groups equal to the minimum window-level query-pair distance associated with the pair.

6. The method of claim 1, wherein the clustering is performed using DBSCAN and setting the distance threshold parameter of DBSCAN to the final group distances.

7. The method of claim 2, wherein the predefined feature similarity condition is satisfied if the calculated Jacard similarity index is 0.2 or more.

8. The method of claim 4 further comprising: setting the timestamp-level group distance to equal the average of the top-3-minimum news distances.

9. The method of claim 4, wherein at least a portion of the content and entity embeddings are retrieved from a caching component.

10. The method of claim 1, wherein clustering the time-stable set of news query groups using the final group distances generates a time-stable set of news query group clusters, and further comprising: serving the time-stable set of news query group clusters to a website for display in a ranked list of trending news topics.

11. A non-transitory computer readable medium comprising computer executable instructions that when executed by a processor perform a method, comprising:
   retrieving, by a grouping component of a search clustering system, a timestamp set of news queries;
   determining, by the grouping component, a time-stable set of news query groups from the timestamp set of news queries by:
   determining, for each pair of news queries in the timestamp set of news queries, whether a predefined feature similarity condition between the pair is satisfied and, if so, classifying the pair as having a grouped timestamp-level grouping status, and if not, classifying the pair as having an ungrouped timestamp-level grouping status;

determining a window-level grouping status of the pair based on whether a predefined window-level similarity condition between the pair is satisfied and if so, classifying the pair as having a grouped window-level grouping status, and if not, classifying the pair as having an ungrouped window-level grouping status, wherein the time-stable set of news query groups comprises a set of news query pairs in the timestamp set of news queries having a window-level grouping status classification indicative of being grouped;

determining, by a clustering component of the search clustering system, a time-stable set of news query group clusters by:

determining a timestamp-level group distance for each pair of groups in the time-stable set of news query groups, wherein each pair of groups comprises a first group and a second group;

determining, for each pair of groups in the time-stable set of news query groups, a timestamp-level query-pair distance for each query pair between queries of the first group and queries of the second group by setting each timestamp-level query-pair distance between the first group and the second group to a distance based on the timestamp-level group distance between the first group and the second group;

determining, for each query pair between queries of the first group and queries of the second group of each pair of groups in the time-stable set of news query groups, a window-level query-pair distance based on a rolling average of the timestamp-level query-pair distances;

identifying, for each pair of groups in the time-stable set of news query groups, a minimum window-level query-pair distance;

determining a final group distance for each pair of groups in the time-stable set of news query groups based on the minimum window-level query-pair distance associated with the pair; and clustering, by the clustering component, the time-stable set of news query groups, using the final group distances.

12. The non-transitory computer readable medium of claim 11, wherein determining whether a predefined feature similarity condition is satisfied comprises calculating a Jacard similarity index using a first and second set of URLs, wherein the first and second sets of URLs correspond, respectively, to a first and second set of news articles of a first and second news query of the pair of news queries.

13. The non-transitory computer readable medium of claim 11, wherein determining a window-level grouping status comprises performing, by the grouping component, a voting routine that combines a current timestamp-level grouping status of the pair with the pair's timestamp-level grouping status at one or more prior time slots.

14. The non-transitory computer readable medium of claim 11, wherein determining the timestamp-level group distance comprises determining, for each news article of the first group, news distance to each news article of the second group, wherein news distance is determined based on cosine similarity of news article content and entity embeddings.

15. The non-transitory computer readable medium of claim 11, wherein determining a final group distance for each pair of groups comprises setting the final group distance for each pair of groups equal to the minimum window-level query-pair distance associated with the pair.

16. The non-transitory computer readable medium of claim 11, wherein the clustering is performed using DBSCAN and setting the distance threshold parameter of DBSCAN to the final group distances.

17. The non-transitory computer readable medium of claim 12, wherein the predefined feature similarity condition is satisfied if the calculated Jacard similarity index is 0.2 or more.

18. The non-transitory computer readable medium of claim 14, wherein the operations further comprise: setting the timestamp-level group distance to equal the average of the top-3-minimum news distances.

19. The non-transitory computer readable medium of claim 11, wherein at least a portion of the content and entity embeddings are retrieved from a caching component.

20. A system comprising:
a grouping component configured to generate a time-stable set of news query groups by pairwise grouping a plurality of news queries from a timestamp set of news queries, based on news article URL similarity, wherein each news query comprises a plurality of news articles; and
a clustering component configured to calculate a set of time window-level, smoothed distances between each pair of news query groups in the time-stable set of news query groups and to use the set of distances to generate a set of stable group clusters.

* * * * *